(12) United States Patent
Sun et al.

(10) Patent No.: US 10,176,819 B2
(45) Date of Patent: Jan. 8, 2019

(54) PHONETIC POSTERIORGRAMS FOR MANY-TO-ONE VOICE CONVERSION

(71) Applicant: The Chinese University of Hong Kong, Shatin, New Territories, Hong Kong (CN)

(72) Inventors: Lifa Sun, Hengshui (CN); Kun Li, Hong Kong (CN); Hao Wang, Henan (CN); Shiyin Kang, Xinjiang (CN); Mei Ling Helen Meng, Hong Kong (CN)

(73) Assignee: The Chinese University of Hong Kong, Shatin, N.T., Hong Kong (CN)

( * ) Notice: Subject to any disclaimer, the term of this patent is extended or adjusted under 35 U.S.C. 154(b) by 0 days.

(21) Appl. No.: 15/618,980

(22) Filed: Jun. 9, 2017

(65) Prior Publication Data

US 2018/0012613 A1    Jan. 11, 2018

Related U.S. Application Data

(60) Provisional application No. 62/360,571, filed on Jul. 11, 2016.

(51) Int. Cl.
*G10L 13/033* (2013.01)
*G10L 25/24* (2013.01)
(Continued)

(52) U.S. Cl.
CPC .......... *G10L 21/007* (2013.01); *G10L 13/033* (2013.01); *G10L 15/08* (2013.01);
(Continued)

(58) Field of Classification Search
CPC ..... G10L 13/00; G10L 13/033; G10L 13/047; G10L 15/16; G10L 25/24; G10L 2021/0135
(Continued)

(56) References Cited

U.S. PATENT DOCUMENTS 5,913,193 A * 6/1999 Huang ................ G10L 13/07
704/256
6,163,769 A * 12/2000 Acero ................ G10L 13/07
704/243
(Continued)

OTHER PUBLICATIONS

Kintzley et al., "Text-to-Speech Inspired Duration Modeling for Improved Whole-Work Acoustic Models", Interspeech 2013, Aug. 25-29, 2013, pp. 1253 to 1257.*
(Continued)

*Primary Examiner* — Martin Lerner
(74) *Attorney, Agent, or Firm* — Kilpatrick Townsend & Stockton LLP (57) ABSTRACT

A method for converting speech using phonetic posteriorgrams (PPGs). A target speech is obtained and a PPG is generated based on acoustic features of the target speech. Generating the PPG may include using a speaker-independent automatic speech recognition (SI-ASR) system for equalizing different speakers. The PPG includes a set of values corresponding to a range of times and a range of phonetic classes, the phonetic classes corresponding to senones. A mapping between the PPG and one or more segments of the target speech is generated. A source speech is obtained, and the source speech is converted into a converted speech based on the PPG and the mapping.

20 Claims, 9 Drawing Sheets

(51) Int. Cl.
*G10L 21/007* (2013.01)
*G10L 15/08* (2006.01)
*G10L 15/16* (2006.01)
*G10L 15/187* (2013.01)
G10L 15/02 (2006.01)
G10L 15/06 (2013.01)
G10L 21/013 (2013.01)

(52) U.S. Cl.
CPC ............ *G10L 15/16* (2013.01); *G10L 15/187* (2013.01); *G10L 25/24* (2013.01); *G10L 15/02* (2013.01); *G10L 15/063* (2013.01); *G10L 2021/0135* (2013.01)

(58) Field of Classification Search
USPC ........ 704/232, 258, 259, 260, 261, 266, 269
See application file for complete search history.

(56) References Cited

U.S. PATENT DOCUMENTS

| | | | | |
|---|---|---|---|---|
| 7,505,950 | B2* | 3/2009 | Tian | G10L 13/033 704/208 |
| 9,799,333 | B2* | 10/2017 | Kintzley | G10L 15/22 |
| 2007/0213987 | A1* | 9/2007 | Turk | G10L 13/033 704/268 |
| 2007/0233490 | A1* | 10/2007 | Yao | G10L 13/08 704/260 |
| 2008/0262838 | A1* | 10/2008 | Nurminen | G10L 13/033 704/222 |
| 2010/0217589 | A1* | 8/2010 | Gruhn | G10L 15/063 704/232 |
| 2011/0218803 | A1* | 9/2011 | Ketabdar | G10L 25/48 704/240 |
| 2012/0253794 | A1* | 10/2012 | Chun | G10L 21/007 704/201 |
| 2015/0127350 | A1* | 5/2015 | Agiomyrgiannakis | G10L 13/02 704/266 |
| 2015/0371635 | A1* | 12/2015 | Kintzley | G10L 15/22 704/251 |
| 2016/0232142 | A1* | 8/2016 | Melnikov | G10L 13/08 |

OTHER PUBLICATIONS

Sun et al., "Voice Conversion Using Deep Bidirectional Long Short-Term Memory Based Recurrent Neural Networks", Apr. 19-24, 2015, 2015 IEEE International Conference on Acoustics, Speech and Signal Processing (ICASSP), Abstract Only, 2 Pages.*

Madhavi et al., "VTLN-Warped Gaussian Posteriorgram for QbE-STD", 2017 25th European Signal Processing Conference (EUSIPCO), pp. 593 to 597. (Year: 2017).*

Muscariello et al., "Zero-resource audio-only spoken term detection based on a combination of template matching techniques", 12th Annual Conference of the International Speech Communication Association, Interspeech 2011, Aug. 2011, 4 Pages. (Year: 2011).*

Abhijeet Saxena, "Significance of Knowledge-based Representation of Speech for Spoken Term Detection", Master of Science Thesis, Nov. 2015, 44 Pages. (Year: 2015).*

Sun et al., "Personalized Cross-lingual TTS Using Phonetic Posteriorgrams", Interspeech 2016, Sep. 8-12, 2016, pp. 322 to 326. (Year: 2016).*

Zhang et al., "Resource Configurable Spoken Query Detection Using Deep Boltzmann Machines", 2012 IEEE International Conference on Acoustics, Speech and Signal Processing (ICASSP), Mar. 25-30, 2012, pp. 5161 to 5164. (Year: 2012).*

Aryal et al., "Articulatory-based Conversion of Foreign Accents with Deep Neural Networks," Interspeech, Sep. 6-10, 2015, 2015 Dresden, Germany, 3385-3389.

Hazen, et al, "Query-by-example spoken term detection using phonetic posteriorgram templates." In Automatic Speech Recognition & Understanding, 2009. ASRU 2009. IEEE Workshop on, pp. 421-426. IEEE, 2009.

Kawahara et al., "Restructuring speech representations using a pitch-adaptive time-frequency smoothing and an instantaneous-frequency-based F0 extraction: Possible role of a repetitive structure in sounds," Speech Communication 27 (1999), 187-207.

Kintzley, et al., "Event selection from phone posteriorgrams using matched filters." In Twelfth Annual Conference of the International Speech Communication Association. 2011.

Kominek, et al., "The CMU Arctic speech databases." In Fifth ISCA Workshop on Speech Synthesis. 2004.

Povey, et al. "The Kaldi speech recognition toolkit." In IEEE 2011 workshop on automatic speech recognition and understanding, No. EPFL-CONF-192584. IEEE Signal Processing Society, 2011.

Sun, et al., "Voice conversion using deep bidirectional long short-term memory based recurrent neural networks." In Acoustics, Speech and Signal Processing (ICASSP), 2015 IEEE International Conference on, pp. 4869-4873. IEEE, 2015.

Weniger et al., "Introducing CURRENNT: The Munich Open-Source CUDA RecurREnt Neural Network Tookit," Journal of Machine Learning Research, 16, (2015) 547-551.

* cited by examiner

PHONETIC POSTERIORGRAMS FOR MANY-TO-ONE VOICE CONVERSION

CROSS-REFERENCES TO RELATED APPLICATIONS

This application claims priority to U.S. Provisional Patent Application No. 62/360,571, filed on Jul. 11, 2016, entitled "Phonetic Posteriorgrams for Many-To-One Voice Conversion", the disclosure of which is hereby incorporated by reference in its entirety for all purposes.

BACKGROUND OF THE INVENTION

Voice conversion aims to modify the speech of one speaker to make it sound as if it were spoken by another specific speaker. Voice conversion can be widely applied to many fields including customized feedback of computer-aided pronunciation training systems, development of personalized speaking aids for speech-impaired subjects, movie dubbing with various persons' voices, among others.

BRIEF SUMMARY OF THE INVENTION

A computer-implemented method for converting speech is provided. The method may include obtaining a target speech and a source speech. The method may also include generating a phonetic posteriorgram (PPG) based on acoustic features of the target speech. In some embodiments, the PPG may include a set of values corresponding to a range of times and a range of phonetic classes. The method may further include generating a mapping between the PPG and the acoustic features of the target speech. In some embodiments, the method may include converting the source speech into a converted speech based on the PPG and the mapping.

In some embodiments, the range of phonetic classes may correspond to a range of senones. In some embodiments, the set of values may correspond to posterior probabilities of each of the range of phonetic classes for each of the range of times. In some embodiments, the PPG may comprise a matrix. In some embodiments, the source speech may be different than the target speech. In some embodiments, generating the PPG may include using a speaker-independent automatic speech recognition (SI-ASR) system for equalizing different speakers.

In some embodiments, generating the mapping between the PPG and the acoustic features of the target speech may include using a bidirectional long short-term memory based recurrent neural network (DBLSTM) structure to model the mapping. In some embodiments, the mapping may be between the PPG and corresponding acoustic features of the target speech. In some embodiments, converting the source speech into the converted speech may include converting the PPG into one or more mel-cepstral coefficients (MCEPs) using a trained DBLSTM model.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

DETAILED DESCRIPTION OF THE INVENTION

Typical approaches to voice conversion training are as follows: first, speech segments (e.g., frames) with the same spoken content are aligned. Second, the mapping from source acoustic features to target acoustic features is found. In some approaches, voice conversion relies on parallel training data in which speech recordings come in pairs by the source speaker and the target speaker uttering the same sentences. In one approach, a continuous probabilistic transformation approach based on Gaussian Mixture Models (GMMs) is used. In another approach, the performance of the GMM-based method may be improved by using global variance to alleviate the over-smoothing effect. Another approach involves a non-negative matrix factorization-based method to use speech exemplars to synthesize converted speech directly. Another approach uses a Deep Neural Network (DNN) to map the source and target in high order space. Another approach employs a DBLSTM-based approach to model the relationships between source and target speeches by using spectral features and their context information.

Although each of these approaches provide reasonably good results, parallel data is not easily available. Therefore, approaches to voice conversion that utilize non-parallel data are desirable. Some of these approaches focus on finding proper frame alignments that is not so straightforward. One approach uses an iterative alignment method to pair phonetically equivalent acoustic vectors from non-parallel utterances. Another approach employs a supervisory data alignment method, where phonetic information is used as the restriction during alignment. Another approach employs a dynamic kernel partial least squares regression-based approach for non-parallel data by combining it with an iterative alignment algorithm. Another approach uses temporal context information to improve the iterative alignment accuracy of non-parallel data. In general, voice conversion approaches that rely on non-parallel data are often inferior to approaches that rely on parallel data.

The present disclosure presents a novel approach using non-parallel training and easily accessible PPGs that performs better than parallel data approaches. A PPG is a time-versus-class matrix representing the posterior probabilities of each phonetic class for each specific time frame of one utterance. Embodiments of the present disclosure generate PPGs by employing a speaker independent automatic speech recognition (SI-ASR) system for equalizing speaker differences. Then, a DBLSTM structure is used to model the mapping between the obtained PPGs and the corresponding acoustic features of the target speaker for speech parameter generation. Finally, voice conversion is performed by driving the trained DBLSTM model with the source speaker's PPGs (obtained from the same SI-ASR). It is important to note that, in some embodiments of the present disclosure, there may be no use of linguistic information behind PPGs from SI-ASR in voice conversion. Three advantages of the approach described in the present disclosure are as follows. First, no parallel training data is required. Second, no alignment process (e.g., DTW) is required, which avoids the influence of possible alignment errors. Third, a trained model can be applied to any other source speakers as long as the target speaker is fixed (as in many-to-one conversion). In many voice conversion approaches that use parallel data, a trained model is only applicable to a specific source speaker (as in one-to-one conversion).

Figure 1:
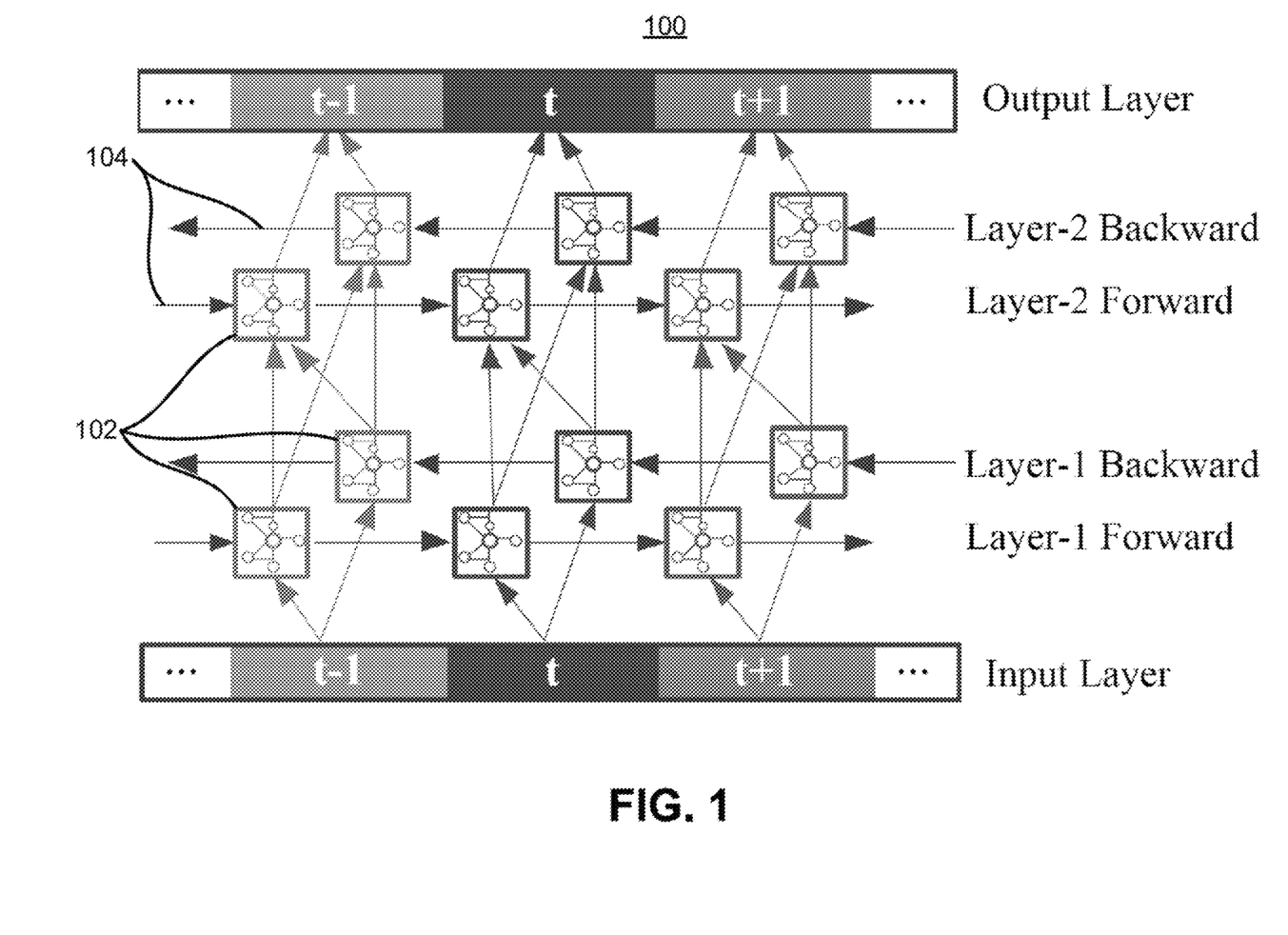
FIG. 1 shows a diagram of a DBLSTM architecture, according to some embodiments of the present disclosure.

FIG. 1 shows a diagram of a DBLSTM architecture 100 including memory blocks 102 and recurrent connections 104, according to some embodiments of the present disclosure. As shown in FIG. 1, DBLSTM may be a sequence to sequence mapping model. The middle section, the left section and the right section (marked with "t", "t−1", and "t+1" respectively) stand for the current frame, the previous frame and the following frame respectively. Each square in FIG. 1 represents one memory block 102, which contains self-connected memory cells and three gate units (i.e., input, output and forget gates) that can respectively provide write, read and reset operations. Furthermore, bidirectional connections of each layer may make full use of the context information in both forward and backward directions. The DBLSTM network architecture 100 including memory blocks 102 and recurrent connections 104 makes it possible to store information over a longer period of time and to learn the optimal amount of context information.

Figure 2:
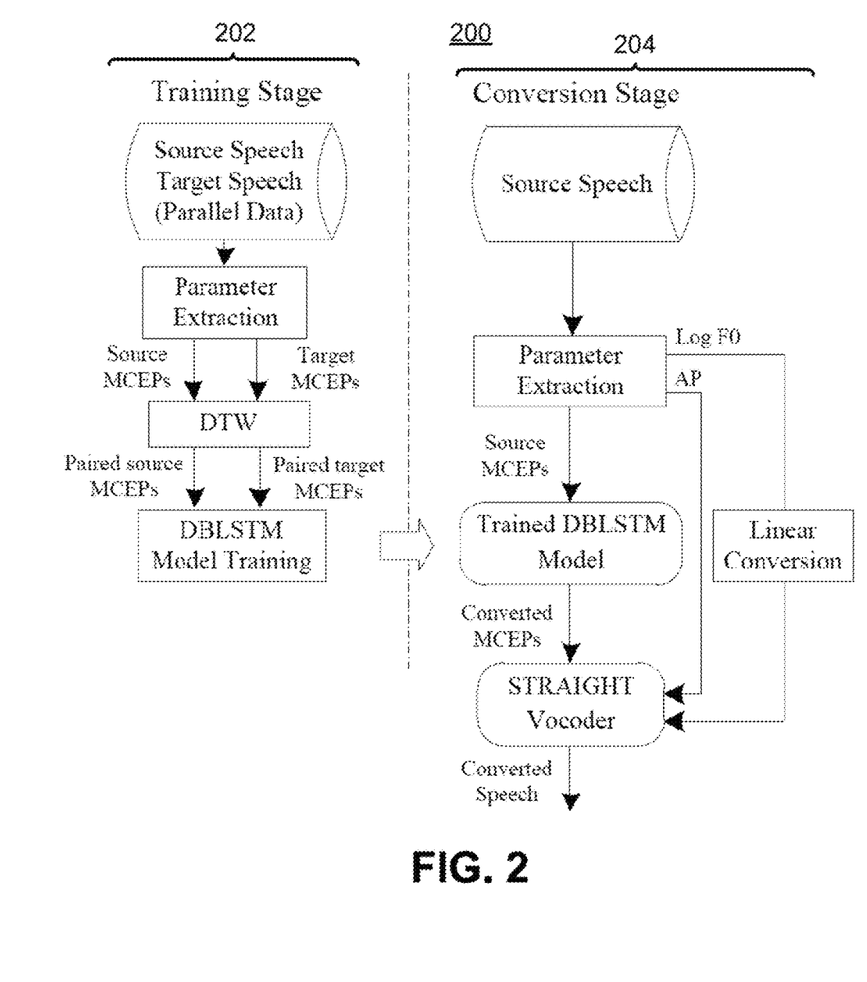
FIG. 2 shows a diagram of a DBLSTM-based voice conversion approach with parallel training data, according to some embodiments of the present disclosure.

FIG. 2 shows a diagram of a DBLSTM-based voice conversion approach 200 with parallel training data, according to some embodiments of the present disclosure. The DBLSTM-based approach 200 may be divided into a training stage 202 and a conversion stage 204 as illustrated in FIG. 2. In the training stage 202, the spectral envelope is extracted by STRAIGHT analysis. Mel-cepstral coefficients (MCEPs) are extracted to represent the spectral envelope and then MCEP features from the same sentences of the source speech and the target speech are aligned by dynamic time warping (DTW). Then, paired MCEP features of the source and target speeches are treated as the training data. Back-propagation through time (BPTT) is used to train DBLSTM model.

In the conversion stage 204, fundamental frequency (F0), MCEPs, and an aperiodic component (AP) are first extracted for one source utterance. Next, parameters of the converted speech are generated as follows: MCEPs are mapped by the trained DBLSTM model. Log F0 is converted by equalizing the mean and the standard deviation of the source and target speeches. The AP is directly copied. Finally, the STRAIGHT vocoder is used to synthesize the speech waveform. Despite its good performance, the DBLSTM-based approach has the following limitations. First, it relies on parallel training data which is expensive to collect. Second, the influence of DTW errors on voice conversion output quality is unavoidable.

The DBLSTM-based voice conversion approach 200 is further described in "VOICE CONVERSION USING DEEP BIDIRECTIONAL LONG SHORT-TERM MEMORY BASED RECURRENT NEURAL NETWORKS", published in the 2015 International Conference on Acoustics, Speech and Signal Processing (ICASSP), the disclosure of which is incorporated by reference herein.

Figure 3:
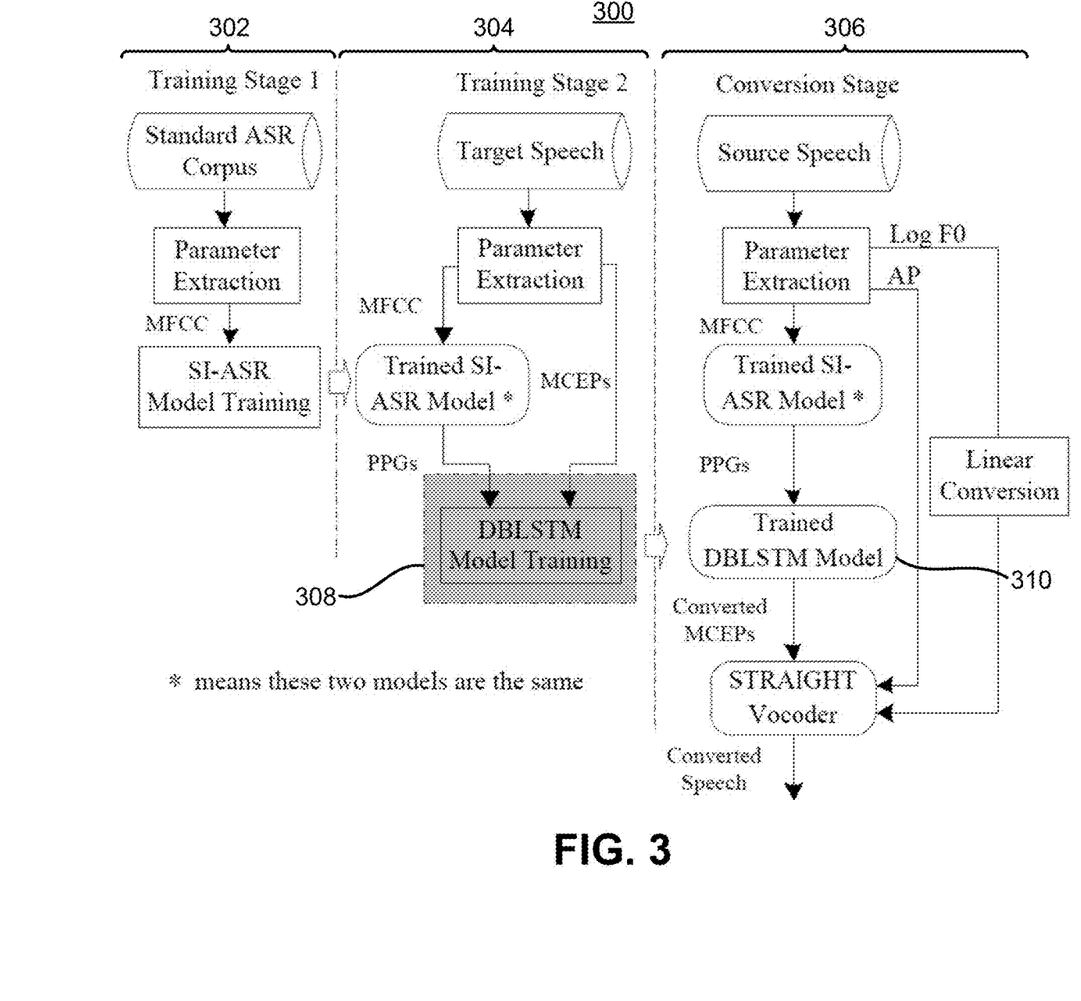
FIG. 3 shows a diagram of a PPGs-based voice conversion approach with non-parallel training data, according to some embodiments of the present disclosure.

FIG. 3 shows a diagram of a PPGs-based voice conversion approach 300 with non-parallel training data, according to some embodiments of the present disclosure. With non-parallel training data, the target speech and source speech may not have any overlapped portion, or at least may not have significant overlapping portions. In some embodiments, the target speech and the source speech may be identical. The PPGs-based approach 300 solves many of the limitations of the DBLSTM-based approach 200, and is partially based on the assumption that PPGs obtained from an SI-ASR system can bridge across speakers (SI stands for speaker-independent). As illustrated in FIG. 3, the PPGs-based approach 300 is divided into three stages: a first training stage 302 (labeled as "Training Stage 1"), a second training stage 304 (labeled as "Training Stage 2"), and a conversion stage 306. The role of the SI-ASR model is to obtain a PPGs representation of the input speech. The second training stage 304 models the relationships between the PPGs and MCEPs features of the target speaker for speech parameter generation and performs a DBLSTM model training 308. The conversion stage 306 drives a trained DBLSTM model 310 with PPGs of the source speech (obtained from the same SI-ASR) for voice conversion.

Figure 4:
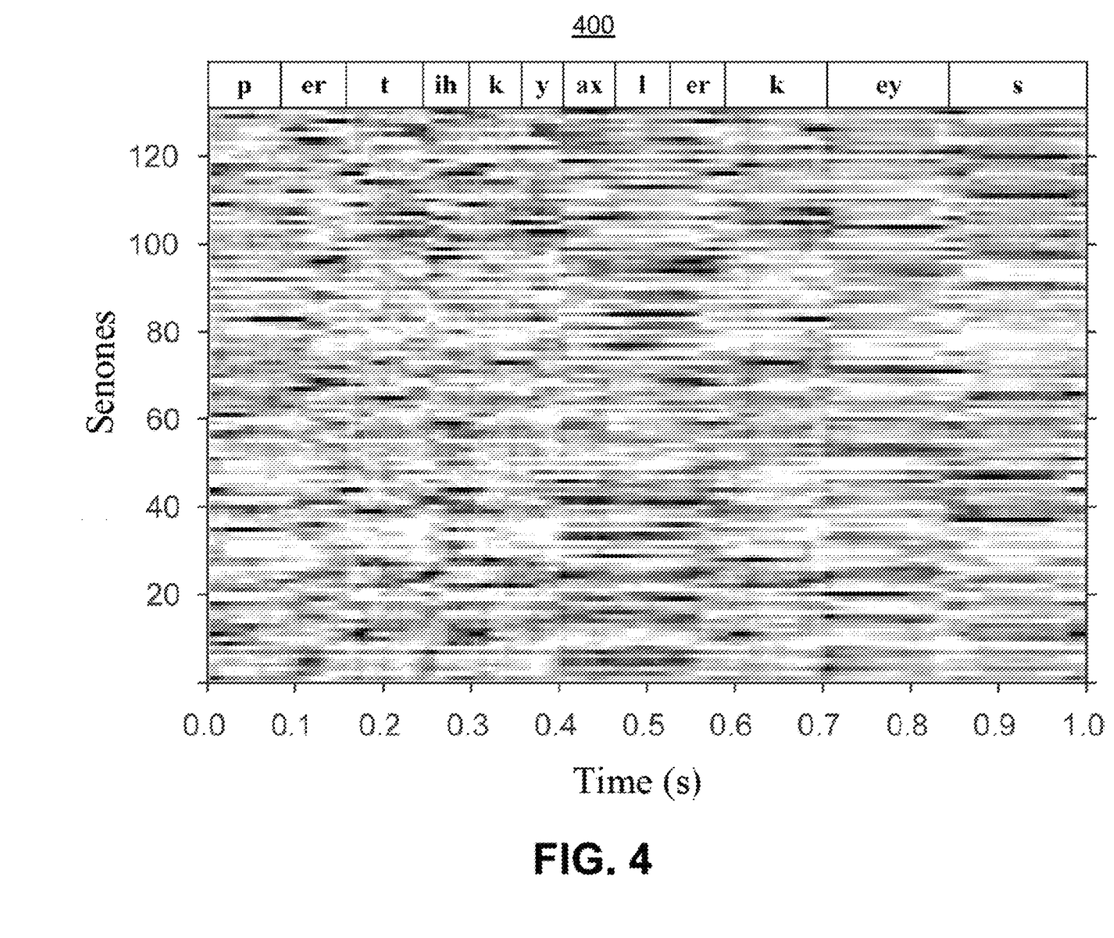
FIG. 4 shows a representation of a PPG, according to some embodiments of the present disclosure.

FIG. 4 shows a representation of a PPG 400, according to some embodiments of the present disclosure. A PPG is a time-versus-class matrix representing the posterior probabilities of each phonetic class for each specific time frame of one utterance. A phonetic class may refer to a word, a phone or a senone. FIG. 4 shows an example of PPG representation for the spoken phrase "particular case", in which senones are treated as the phonetic class. The horizontal axis represents time in seconds and the vertical axis contains indices of phonetic classes. The number of senones is 131 and darker shades imply a higher posterior probability. Where the language content/pronunciations of different speech utterances are the same, the PPGs obtained from SI-ASR are the same. In some embodiments, PPGs obtained from an SI-ASR may represent articulation of speech sounds in a speaker-normalized space and correspond to speech content speaker-independently. Therefore, these PPGs are regarded as a bridge between the source and the target speakers.

In some embodiments, PPG 400 may be a matrix, or another type of data structure. For example, PPG 400 may be a one-dimensional vector or a scalar. In some embodiments, PPG 400 may be modified when additional source and/or target speeches become available. For example, after an initial PPG has been generated for a specific target speaker based on an initial speech, it may be advantageous to modify the initial PPG when an additional speech for the specific target speaker becomes available, particularly in situations where the additional speech is longer in duration than the initial speech.

In the first training stage 302, an SI-ASR system is trained for PPGs generation using a multi-speaker ASR corpus. The equations are illustrated by the example of one utterance. The input is the MFCC feature vector of $t^{th}$ frame, denoted as $X_t$. The output is the vector of posterior probabilities $P_t=(p(s|X_t)|s=1, 2, \ldots, C)$ where $p(s|X_t)$ is the posterior probability of each phonetic class s.

Figure 5:
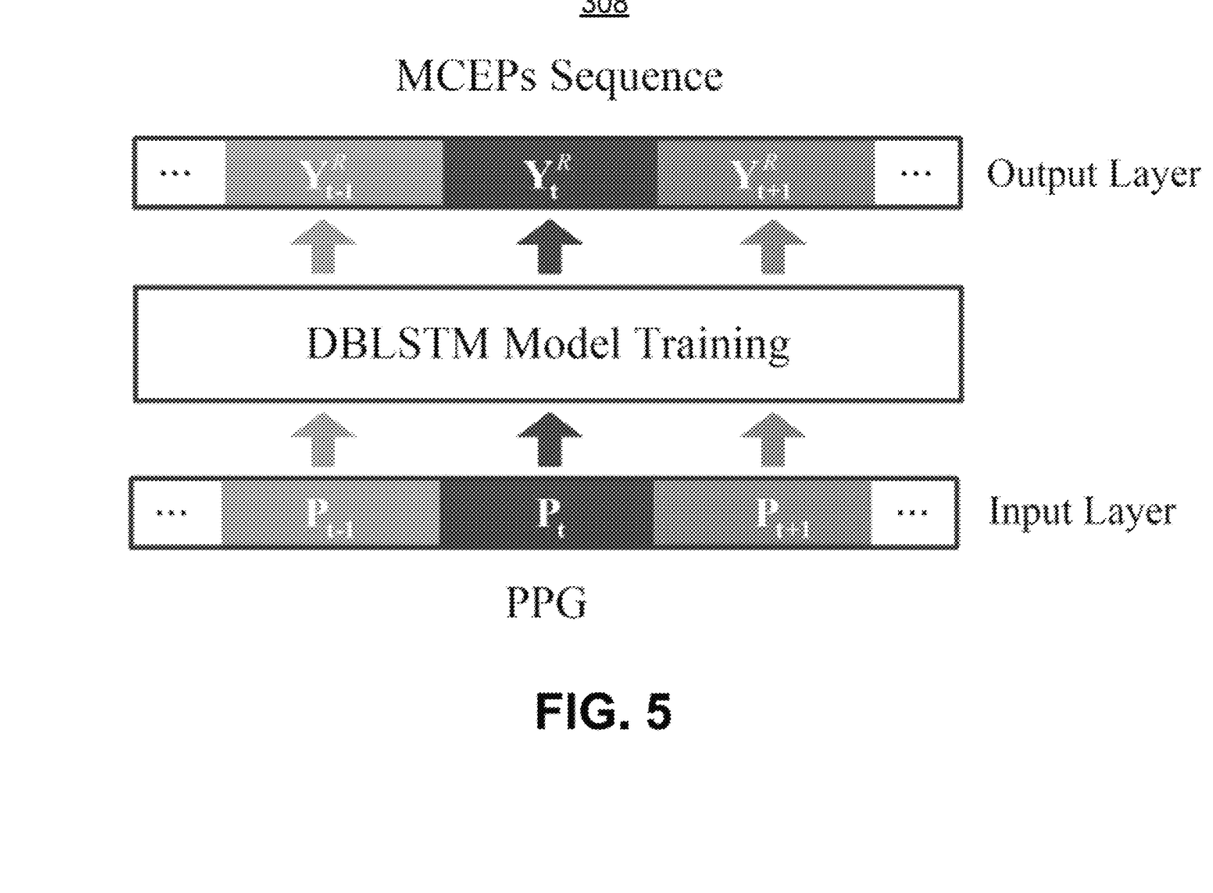
FIG. 5 shows a diagram of a DBLSTM model training, according to some embodiments of the present disclosure.

FIG. 5 shows a diagram of a DBLSTM model training 308, according to some embodiments of the present disclosure. For the second training stage 304, the training data is the target speech and does not need any linguistic or phonetic information. As shown in FIG. 5, the second training stage 304 trains the DBLSTM model (speech parameter generation model) to get the mapping relationships between the PPG and the MCEPs sequence. For a given utterance from the target speaker, t denotes the frame index of this sequence. The input is the PPG $(P_1, \ldots, P_t, \ldots, P_N)$, computed by the trained SI-ASR model. In some embodiments, the ideal value of the output layer may be the MCEPs sequence $(Y_1^T, \ldots, Y_t^T, \ldots, Y_N^T)$, extracted from the target speech. The actual value of the output layer may be $(Y_1^R, \ldots, Y_t^R, \ldots, Y_N^R)$. In some embodiments, the cost function of the second training stage 304 is $$\min \Sigma_{t=1}^N \|Y_t^R - Y_t^T\|^2$$

The model is trained to minimize the cost function through the BPTT technique mentioned previously. Note that the DBLSTM model is trained using only the target speaker's MCEPs features and the speaker-independent PPGs without using any other linguistic information.

In the conversion stage 306 of FIG. 3, the conversion of log F0 and AP may be the same as that of the DBLSTM-based voice conversion approach. First, to get the converted MCEPs, MFCC features of the source speech are extracted. Second, PPGs are obtained from the trained SI-ASR model where the input is MFCC features. Third, PPGs are converted to MCEPs by the trained DBLSTM model. Finally, the converted MCEPs together with the converted log F0 and AP are used by the vocoder to synthesize the output speech.

FIGS. 6A, 6B, 7A, and 7B show experimental results comparing the DBLSTM-based voice conversion approach 200 and the PPGs-based voice conversion approach 300, according to some embodiments of the present disclosure (the DBLSTM-based approach 200 is labeled "baseline" in FIGS. 6A, 6B, 7A, and 7B, and the PPGs-based approach 300 is labeled "PPGs").

A within-gender conversion experiment (male-to-male: BDL to RMS) and a cross-gender conversion experiment (male-to-female: BDL to SLT) were conducted. The DBLSTM-based approach used parallel speech of the source and target speakers while the PPGs-based approach used only the target speaker's speech for model training. The PPGs-based approach used PPGs to augment the DBLSTM. The training data used was 593 sentences (about 42 minutes). The signals were sampled at 16 kHZ with mono channel, windowed with 25 ms and shifted every 5 ms. Acoustic features, including spectral envelope, F0 (1 dimension) and AP (513 dimensions) were extracted by STRAIGHT analysis. The 39th order MCEPs plus log energy were extracted to represent the spectral envelope.

In the PPGs-based approach, the SI-ASR system was implemented using the Kaldi speech recognition toolkit with the TIMIT corpus. The system has a DNN architecture with 4 hidden layers each of which contains 1024 units. Senones were treated as the phonetic class of PPGs. The number of senones was 131, which was obtained by clustering in the first training stage. The hardware configuration of the SI-ASR model training was dual Intel Xeon E5-2640, 8 cores, 2.6 GHZ. The training time was about 11 hours.

Next, the DBLSTM model was adopted to map the relationships of the PPGs sequence and the MCEPs sequence for speech parameter generation. The implementation was based on the machine learning library, CURRENNT. The number of units in each layer was [131 64 64 64 64 39] respectively, where each hidden layer contains one forward LSTM layer and one backward LSTM layer. BPTT was used to train this model with a learning rate of $1.0 \times 10^{-6}$ and a momentum of 0.9. The training process of the DBLSTM model was accelerated by a NVIDIA Tesla K40 GPU and it took about 4 hours for a 100 sentences training set. The baseline DBLSTM-based approach had the same model configuration except that its input had only 39 dimensions (instead of 131). It took about 3 hours for a 100 sentences training set.

Mel-cepstral distortion (MCD) was used to measure how close the converted speech was to the target speech. MCD is the Euclidean distance between the MCEPs of the converted speech and the target speech, denoted as $$MCD[dB] = \frac{10}{\ln 10} \sqrt{2 \sum_{d=1}^{N} (c_d - c_d^{converted})^2}$$

where N is the dimension of MCEPs (excluding the energy feature). $c_d$ and $c_d^{converted}$ are the d-th coefficients of the target and converted MCEPs respectively. To explore the effect of the training data size, all the systems were trained using different amounts of training data—5, 20, 60, 100, and 200 sentences. For the DBLSTM-based approach, the training data consisted of parallel pairs of sentences from the source and target speakers. For the PPGs-based approach, the training data consisted only of the sentences from the target speaker. The test data set had 80 sentences from the source speaker.

Figure 6A:
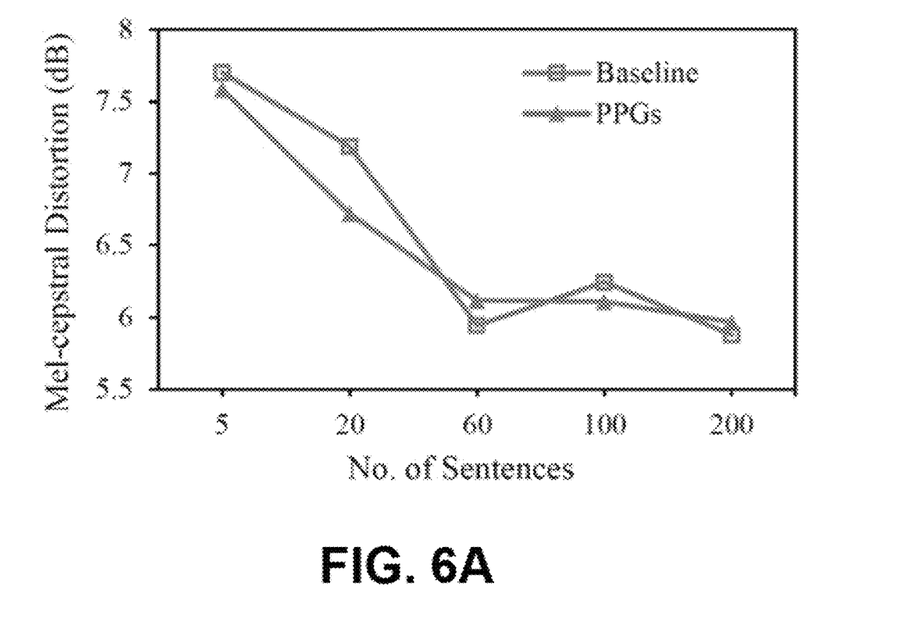
FIGS. 6A and 6B show experimental results for a DBLSTM-based voice conversion approach and a PPGs-based voice conversion approach, according to some embodiments of the present disclosure.
Figure 6B:
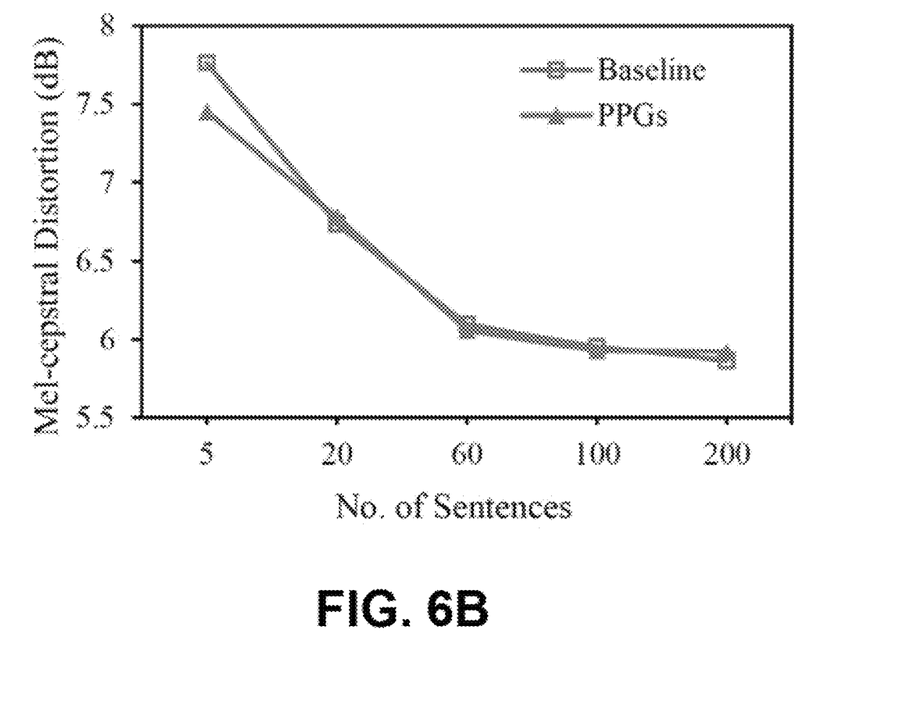

FIG. 6A shows the average MCD of the DBLSTM-based voice conversion approach (labeled "baseline") and the PPGs-based voice conversion approach for the male-to-male conversion experiment. FIG. 6B shows the same for the male-to-female conversion experiment. As shown, when the training size is at 5, 20, and 60 sentences, the MCD value becomes smaller with the increase of the data size. The MCD value tends to converge when the training size is larger than 60 sentences. The results indicate that the DBLSTM-based approach and the PPGs-based approach have similar performance in terms of objective measure.

Figure 7A:
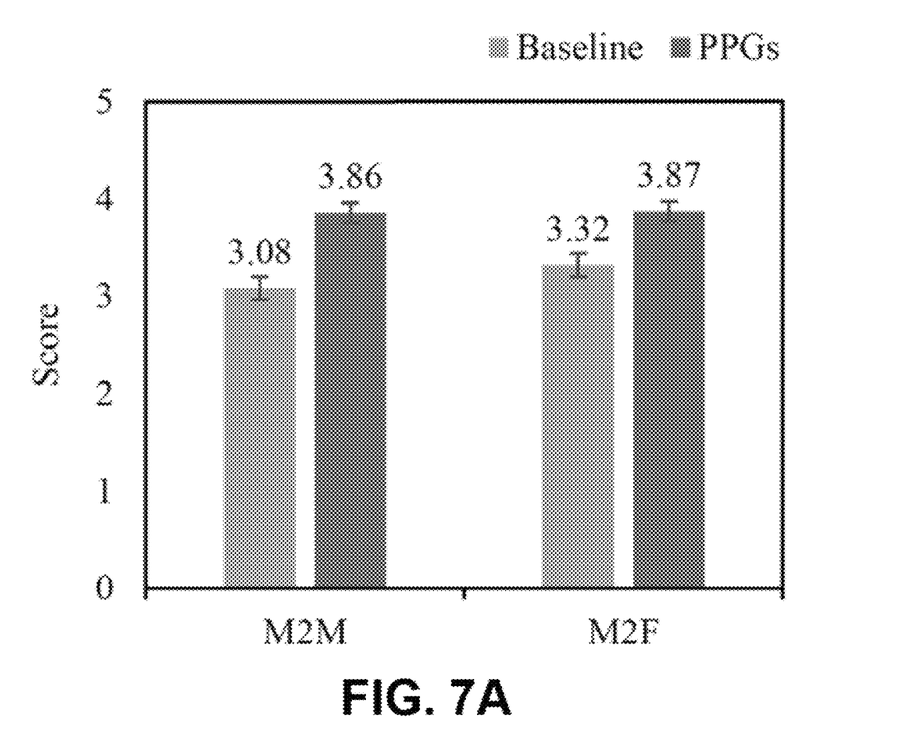
FIGS. 7A and 7B show experimental results for a DBLSTM-based voice conversion approach and a PPGs-based voice conversion approach, according to some embodiments of the present disclosure.

A subjective evaluation comparing the DBLSTM-based approach and the PPGs-based approach was also conducted. A Mean Opinion Score (MOS) test and an ABX preference test were conducted as subjective evaluations for measuring the naturalness and speaker similarity of converted speech. 100 sentences were used for training each system and 10 sentences (not in the training set) were randomly selected for testing. Twenty one participants were asked to do MOS test and ABX test. In the MOS test, listeners are asked to rate the naturalness and clearness of the converted speech on a 5-point scale (5: excellent, 4: good, 3: fair, 2: poor, 1: bad). The results of the MOS test are shown in FIG. 7A. The average scores of the DBLSTM-based approach and PPGs-based approaches were 3.20 and 3.87 respectively. The MOS test results are shown with the 95% confidence intervals.

For the ABX preference test, listeners were asked to choose which of the converted utterances A and B (generated by the two approaches) sound more like the target speaker's recording X, or whether they had no preference.

Figure 7B:
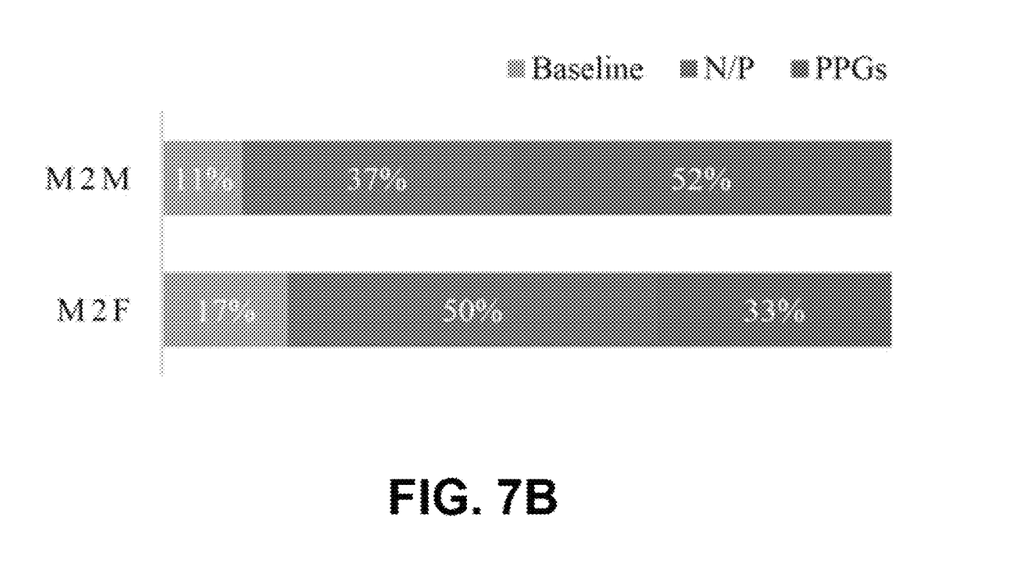

Each pair of A and B were shuffled to avoid preferential bias. As shown in FIG. 7B, the PPGs-based approach is frequently preferred over the baseline approach. The p-values of the two experiments were $2.94 \times 10^{-16}$ and $4.94 \times 10^{-3}$, respectively.

Results from both the MOS test and the ABX test show that the PPGs-based approach performs better than the DBLSTM-based approach in both speech quality and speaker similarity. Possible reasons include: 1) the PPGs-based approach does not require alignment (e.g., DTW), which avoids the influence caused by possible alignment errors; 2) the DBLSTM model of the PPGs-based approach is trained using only the speaker-normalized PPGs and the target speaker's acoustic features. This minimizes the interference from the source speaker's signal.

Figure 8:
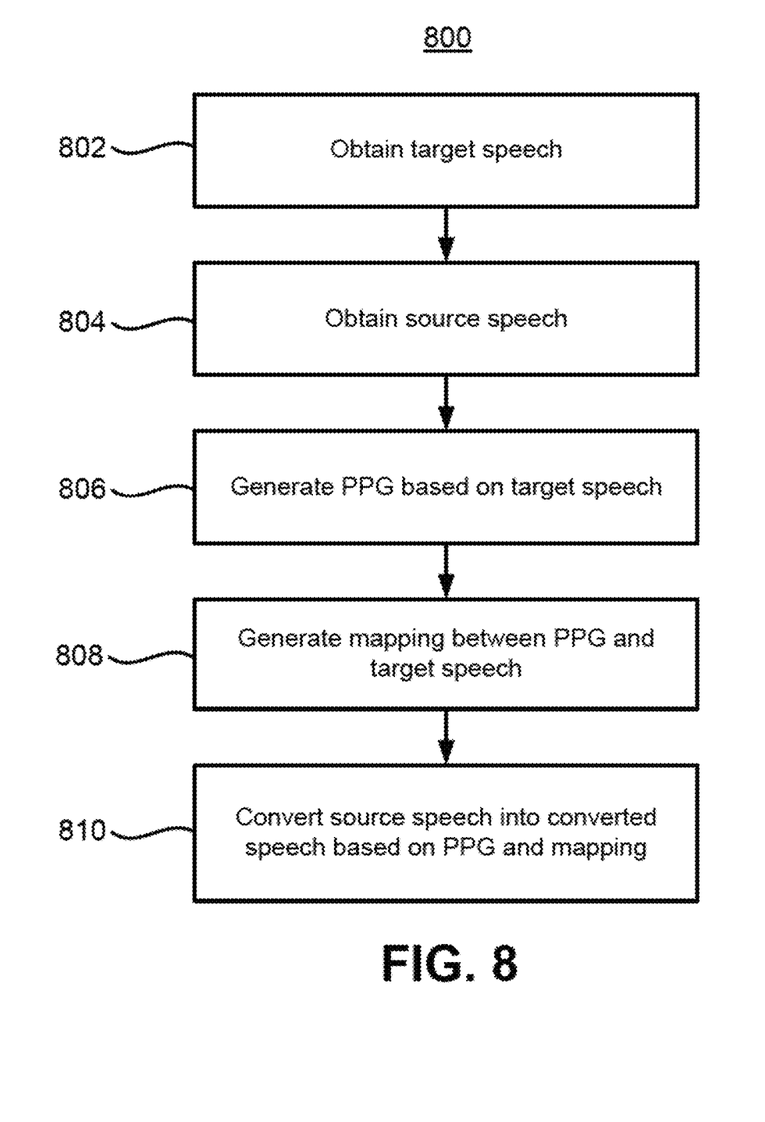
FIG. 8 shows an embodiment of a method for performing voice conversion.

FIG. 8 shows an embodiment of a method 800 for performing voice conversion. At operation 802, a target speech is obtained. At operation 804, a source speech is obtained. At operation 806, a PPG is generated based on acoustic features of the target speech. At operation 808, a mapping is generated between the PPG and one or more segments of the target speech. At operation 810, the source speech are converted into a converted speech based on the PPG and the mapping.

Figure 9:
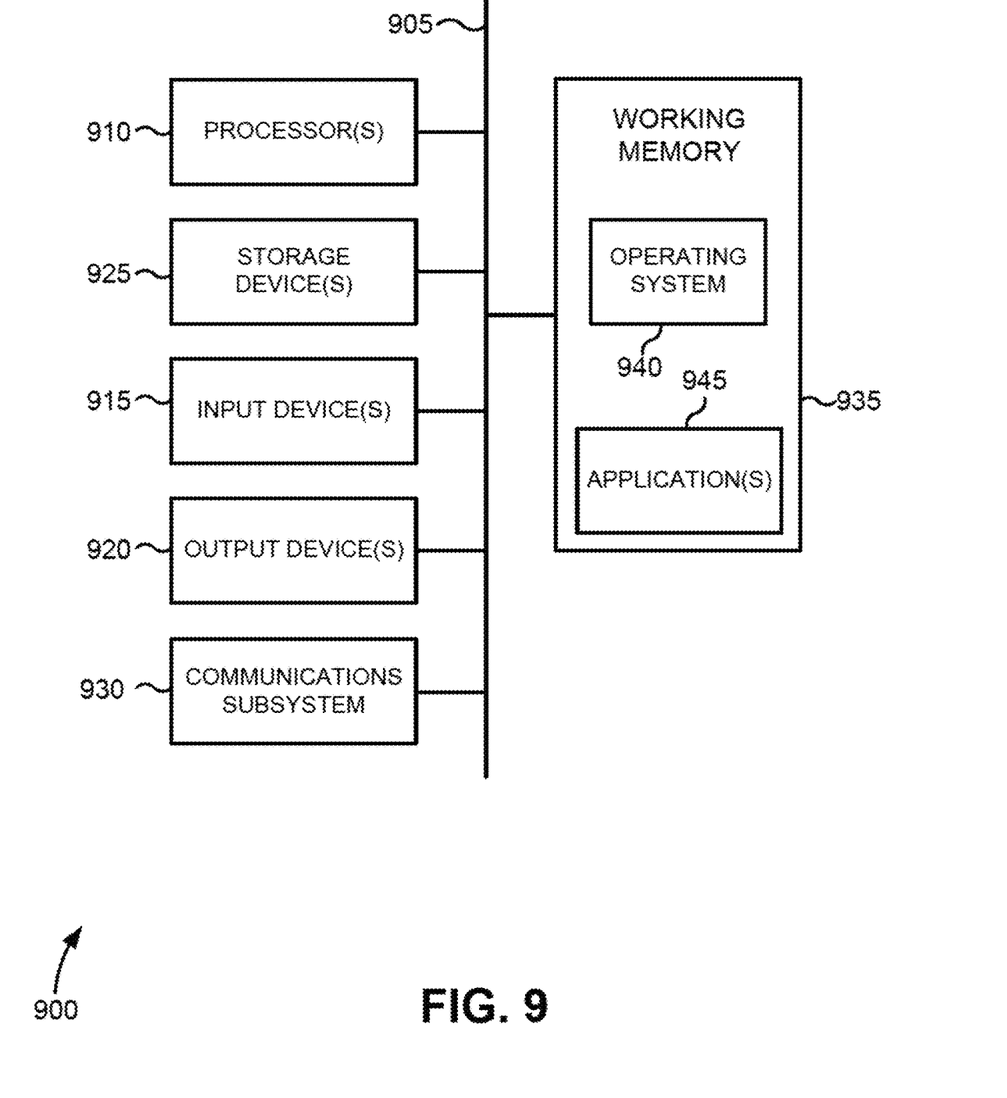
FIG. 9 shows a simplified computer system, according to some embodiments of the present disclosure.

FIG. 9 illustrates a simplified computer system, according to some embodiments of the present disclosure. A computer system 900 as illustrated in FIG. 9 may be incorporated into devices such as a portable electronic device, mobile phone, or other device as described herein. FIG. 9 provides a schematic illustration of one embodiment of a computer system 900 that can perform some or all of the steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905, or may otherwise be in communication, as appropriate. The hardware elements may include one or more processors 910, including without limitation one or more general-purpose processors and/or one or more special-purpose processors such as digital signal processing chips, graphics acceleration processors, and/or the like; one or more input devices 915, which can include without limitation a mouse, a keyboard, a camera, and/or the like; and one or more output devices 920, which can include without limitation a display device, a printer, and/or the like.

The computer system 900 may further include and/or be in communication with one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 930 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 930. In other embodiments, a portable electronic device, e.g. the first electronic device, may be incorporated into the computer system 900, e.g., an electronic device as an input device 915. In some embodiments, the computer system 900 will further comprise a working memory 935, which can include a RAM or ROM device, as described above.

The computer system 900 also can include software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 9, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 925 described above. In some cases, the storage medium might be incorporated within a computer system, such as computer system 900. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 900 to perform methods in accordance with various embodiments of the technology. According to a set of embodiments, some or all of the procedures of such methods are performed by the computer system 900 in response to processor 910 executing one or more sequences of one or more instructions, which might be incorporated into the operating system 940 and/or other code, such as an application program 945, contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 and/or components thereof generally will receive signals, and the bus 905 then might carry the signals and/or the data, instructions, etc. carried by the signals to the working memory 935, from which the processor(s) 910 retrieves and executes the instructions. The instructions received by the working memory 935 may optionally be stored on a non-transitory storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A computer-implemented method comprising:
   obtaining a target speech;
   obtaining a source speech;
   generating a target phonetic posteriorgram (PPG) of the target speech by driving a first model with acoustic features of the target speech, the target PPG including a set of values corresponding to a range of times and a range of phonetic classes;
   extracting target mel-cepstral coefficients (MCEP) features from the target speech;
   training a second model using the target MCEP features and the target PPG to obtain a mapping between the target MCEP features and the target PPG;
   generating a source PPG of the source speech by driving the first model with acoustic features of the source speech; and converting the source speech into a converted speech using the source PPG and the trained second model.

2. The computer-implemented method of claim 1, wherein the range of phonetic classes correspond to a range of senones.

3. The computer-implemented method of claim 1, wherein the set of values correspond to posterior probabilities of each of the range of phonetic classes for each of the range of times, and wherein the target PPG comprises a matrix.

4. The computer-implemented method of claim 1, wherein the source speech is different than the target speech.

5. The computer-implemented method of claim 1, wherein the first model includes a speaker-independent automatic speech recognition (SI-ASR) system for equalizing different speakers.

6. The computer-implemented method of claim 5, wherein the first model is trained for PPGs generation using a multi-speaker ASR corpus, an input being an MFCC feature vector of tth frame, denoted as X_t, and an output being a vector of posterior probabilities defined by P_t=(p (s|X_t)|s=1, 2, . . . , C) where p(s|X_t) is the posterior probability of each phonetic class s.

7. The computer-implemented method of claim 5, wherein training the second model includes using a bidirectional long short-term memory based recurrent neural network (DBLSTM) structure to model the mapping.

8. The computer-implemented method of claim 7, wherein converting the source speech into the converted speech includes converting the source PPG into converted MCEP features using the trained second model.

9. A non-transitory computer-readable medium comprising instructions that, when executed by a processor, cause the processor to perform operations including:
obtaining a target speech;
obtaining a source speech;
generating a target phonetic posteriorgram (PPG) of the target speech by driving a first model with acoustic features of the target speech, the target PPG including a set of values corresponding to a range of times and a range of phonetic classes;
extracting target mel-cepstral coefficients (MCEP) features from the target speech;
training a second model using the target MCEP features and the target PPG to obtain a mapping between the target MCEP features and the target PPG;
generating a source PPG of the source speech by driving the first model with acoustic features of the source speech; and
converting the source speech into a converted speech using the source PPG and the trained second model.

10. The non-transitory computer-readable medium of claim 9, wherein the range of phonetic classes correspond to a range of senones.

11. The non-transitory computer-readable medium of claim 9, wherein the set of values correspond to posterior probabilities of each of the range of phonetic classes for each of the range of times, and wherein the target PPG comprises a matrix.

12. The non-transitory computer-readable medium of claim 9, wherein the source speech is different than the target speech.

13. The non-transitory computer-readable medium of claim 9, wherein the first model includes a speaker-independent automatic speech recognition (SI-ASR) system for equalizing different speakers.

14. The non-transitory computer-readable medium of claim 13, wherein training the second model includes using a bidirectional long short-term memory based recurrent neural network (DBLSTM) structure to model the mapping.

15. The non-transitory computer-readable medium of claim 14, wherein converting the source speech into the converted speech includes converting the source PPG into converted MCEP features using the trained second model.

16. A system comprising:
a processor;
a computer-readable medium in data communication with the processor, the computer-readable medium comprising instructions that, when executed by the processor, cause the processor to perform operations including:
obtaining a target speech;
obtaining a source speech;
generating a target phonetic posteriorgram (PPG) of the target speech by driving a first model with acoustic features of the target speech, the target PPG including a set of values corresponding to a range of times and a range of phonetic classes;
extracting target mel-cepstral coefficients (MCEP) features from the target speech;
training a second model using the target MCEP features and the target PPG to obtain a mapping between the target MCEP features and the target PPG;
generating a source PPG of the source speech by driving the first model with acoustic features of the source speech; and
converting the source speech into a converted speech using the source PPG and the trained second model.

17. The system of claim 16, wherein the range of phonetic classes correspond to a range of senones.

18. The system of claim 16, wherein the set of values correspond to posterior probabilities of each of the range of phonetic classes for each of the range of times, and wherein the target PPG comprises a matrix.

19. The system of claim 16, wherein the first model includes a speaker-independent automatic speech recognition (SI-ASR) system for equalizing different speakers.

20. The system of claim 19, wherein training the second model includes using a bidirectional long short-term memory based recurrent neural network (DBLSTM) structure to model the mapping.

* * * * *